(12) United States Patent
Chamaraju et al.

(10) Patent No.: US 11,562,064 B2
(45) Date of Patent: Jan. 24, 2023

(54) MACHINE LEARNING-BASED SECURITY ALERT ESCALATION GUIDANCE

(71) Applicant: NETIQ CORPORATION, Sanford, NC (US)

(72) Inventors: Manohar Mysore Chamaraju, Bangalore (IN); Mithun Babu, Bangalore (IN); Nandhini Subburaj, Bangalore (IN); John Paul Gassner, Virginia, OH (US); Satyajit H. Katti, Bangalore (IN)

(73) Assignee: NETIQ CORPORATION, Houston, TX (US)

( * ) Notice: Subject to any disclaimer, the term of this patent is extended or adjusted under 35 U.S.C. 154(b) by 859 days.

(21) Appl. No.: 16/359,696

(22) Filed: Mar. 20, 2019

(65) Prior Publication Data

US 2020/0004957 A1 Jan. 2, 2020

(30) Foreign Application Priority Data

Jun. 29, 2018 (IN) .............................. 201841024415

(51) Int. Cl.
*G06F 21/55* (2013.01)
*G06N 7/00* (2006.01)
*G06N 20/00* (2019.01)

(52) U.S. Cl.
CPC ........... *G06F 21/554* (2013.01); *G06N 7/005* (2013.01); *G06N 20/00* (2019.01); *G06F 2221/034* (2013.01)

(58) Field of Classification Search
CPC .. G06F 21/554; G06F 2221/034; G06N 20/00
See application file for complete search history.

(56) References Cited

U.S. PATENT DOCUMENTS

| | | |
|---|---|---|
| 9,548,987 B1 * | 1/2017 | Poole .................. H04L 63/1408 |
| 9,591,006 B2 | 3/2017 | Siva Kumar |
| 9,699,205 B2 | 7/2017 | Muddu |
| 10,873,596 B1 * | 12/2020 | Bourget ................ G06F 21/554 |
| 2016/0226904 A1 * | 8/2016 | Bartos ................... G06F 21/566 |
| 2017/0279822 A1 | 9/2017 | Lord |
| 2018/0020021 A1 | 1/2018 | Gilmore |
| 2018/0367561 A1 * | 12/2018 | Givental ............... G06F 21/552 |
| 2019/0340353 A1 * | 11/2019 | Mitelman ............. G06F 21/554 |

OTHER PUBLICATIONS

Aankur Bhatia; Improve Threat Classification Accuracy with Supervised Machine Learning; https://securityintelligence.com/improve-threat-classification-accuracy-with-supervised-machine-learning/; Jan. 6, 2017; 7 pages.

(Continued)

*Primary Examiner* — Hee K Song
(74) *Attorney, Agent, or Firm* — Sheridan Ross P.C.

(57) ABSTRACT

A technique includes receiving, by a processor, a security alert that is generated in response to one or more events occurring in a computer system. The technique includes applying, by the processor, machine learning to the security alert to predict a probability that the security alert will be escalated to an incident; and displaying an output on a display to guide processing of the security alert based on the predicted probability.

20 Claims, 9 Drawing Sheets

(56) References Cited

OTHER PUBLICATIONS

Ram Shankar Siva Kumar: Suppressing False Alerts in Data Security; O'Reilly Media, Inc.; https://www.oreilly.com/ideas/suppressing-false-alerts-in-data-security; May 16, 2018; 10 pages.
Sangani et al; Machine Learning in Application Security; INTECH Open Science/Open Minds, Chapter 3; http://dx.doi.org/10.5772/intechopen.68796; 2017; 23 pages.
Trend Micro USA; Machine Learning; https://www.trendmicro.com/vinfo/us/security/definition/machine-learning; May 16, 2018; 17 Pages.

* cited by examiner

| ID | SEVERITY | INITIAL USER NAME | TARGET USER NAME | SOURCE IP | DESTINATION IP | SOURCE PORT | DESTINATION PORT | TARGET RESOURCE NAME | REPEAT COUNT | SOURCE HOST THREAT REPUTATION | SOURCE HOST THREAT TYPE | TARGET HOST THREAT REPUTATION | TARGET HOST THREAT TYPE | XDASCLASS | XDASOUTCOME |
|---|---|---|---|---|---|---|---|---|---|---|---|---|---|---|---|
| 0 | 1 | JOE | JOE | 10.2.2.2 | 10.3.3.3 | 5778 | 443 | N/A | 1 | 100 | N/A | 100 | MALWARE | CREATE ACCOUNT | SUCCESS |
| 100 | 3 | ADAM | ADAM | 10.1.1.1 | 10.2.2.2 | 5670 | 22 | N/A | 5 | 50 | BOTNET | 10 | BOTNET | AUTHENTICATION | FAILED |
| 101 | 5 | ANDY | ADAM | 10.1.1.1 | 10.2.2.2 | 5670 | 8443 | CONFIDENTIAL.TXT | 10 | 20 | PROXY | 20 | WORM | FILE ACCESS | FORBIDDEN |

MACHINE LEARNING-BASED SECURITY ALERT ESCALATION GUIDANCE

BACKGROUND

An enterprise may employ a system of software and services, called a "security information and event management (SIEM) system," for purposes of detecting and responding to security threats that occur with the enterprise's computer system. The SIEM may monitor events (login failures, device communications with external domains, downloading of restricted files, and so forth) of the computer system for purposes of generating corresponding security alerts. A security alert brings a particular event that is consistent with a security threat to the attention of a human security analyst for further analysis. In this manner, a security analyst may evaluate a security alert to determine if the underlying event warrants further investigation, and if so, the security analyst may escalate the security alert to be an "incident." An incident refers to a matter that is associated with one or multiple events that appear to be related to each other. A security analyst may investigate an incident by gathering information about the underlying event or events (gathering information about users, accounts, devices, communications, and so forth) for purposes of determining whether the incident is associated with an actual security threat to the computer system and if so, for purposes of determining remedial actions for the security threat.

DETAILED DESCRIPTION

A security operation center (SOC) for an enterprise may contain a relatively large staff of human security analysts to monitor and address security alerts, which may be generated by the enterprise's security information and event management (SIEM) system. In general, the SIEM system may include security analytics engines that operate in an automated manner to monitor event data (logged data collected by system devices, for example) of a computer system for purposes of identifying events of the computer system, which are consistent with security threats to the system. For such identified events, the security analytics engines may automatically generate security alerts to bring the underlying events to the attention of the security analysts of the SOC.

The event data that is monitored by the security analytics engines refers to data produced by operation of the computer system and may originate with various sources of the computer system, such as hosts, network components, communications with external entities (web servers, for example), and so forth. As examples, the security analytics engines may analyze event data associated with hypertext protocol (HTTP) logs, domain name service (DNS) logs, virtual private network (VPN) logs, nefflow traffic, intrusion detection system (IDS) logs, and so forth. In accordance with various implementations, the event data analyzed by the security analytics engines may be derived from hardware devices as well as from software components of the computer system.

The number of events occurring in a given computer system per day may be in the range of billions per day, whereas the SOC may receive in the range of hundreds to thousands of security alerts per day. Keeping up with such a large number of security alerts may be challenging, even for a highly-staffed SOC.

In general, the SIEM may have processor-based tools that the security analysts use to evaluate security alerts for purposes of performing a "security alert triage." In the security alert triage, the security analysts assess the security alerts to determine which alerts should be escalated to corresponding "incidents" for further investigation. In this manner, security analysts investigate the events underlying the incidents via processor-based tools of the SIEM to determine whether or not the incidents are related to actual, security threats to the computer system. When a security analyst determines that the events associated with a given incident is due to an actual security threat to the computer system, the security analyst may determine and initiate the appropriate remediation actions (e.g., actions to shut down a switch, close an account, quarantine software, and so forth).

In accordance with example implementations that are described herein, a SIEM system uses a machine learning-based approach to provide guidance to security analysts to aid the analysts in the process of sorting security alerts into incidents and non-incidents. More specifically, in accordance with example implementations, the SIEM uses a supervised machine learning engine to analyze features associated with security alerts for purposes of classifying the alerts into respective incident categories, or classes. In accordance with example implementations, the classes may include a false positive class (i.e., a class representing that the security alert is not associated to an actual security threat) and one or multiple other classes that correspond to incidents that are currently being investigated by the security analysts or have been investigated by security analysts. In this manner, an "incident," or "existing incident," refers to closed incidents (on which the supervised machine learning engine has been trained) as well as open incidents (incidents that are still being investigated). A security analyst may reopen a closed incident to work on the incident. In accordance with example implementations, the supervised machine learning engine determines associated confidence levels (probabilities, for example) that a given security alert will ultimately be classified by the security analysists (after further investigation) as belonging to these classes. Thus, in accordance with example implementations, the supervised machine learning engine may emit confidence levels, or probabilities, for the security alert being related to both closed incidents and open incidents.

As an example scenario, there may be two incidents for a given computer system, and these two incidents may be assigned identifications (IDs), such as the IDs of "100" and "101." The supervised machine learning engine is trained on Security alerts that are not escalated may be treated as false positives and are each assigned the incident ID of "0." Therefore, for this example scenario, there are three classes (i.e., two classes for the incident IDs 100 and 101, and another class for non-incidents, of false positives); and for a given security alert, the supervised machine learning engine may determine a probability, or confidence level, for the given security alert ultimately belonging to each of these classes.

In general, the supervised machine learning engine may provide a recommendation, or guidance, in the form of a guidance output that represents the confidence levels. In accordance with some implementations, the guidance output may be a visual output that is provided by a graphical image on a display, or monitor, of a computer system. For example, in accordance with some implementations, the visual output may be a window or table depicting potential classes, or categories for the given security alert and corresponding probabilities that the given security alert belongs in one of these classes. In accordance with further example implementations, the guidance output may take on other sensory forms. In this manner, depending on the particular implementation, the guidance output may be a visual output, an audio output, a combination of visual and audio outputs, and so forth).

Regardless of the particular form, the guidance output may be represented for the example scenario by a tuple in the format of [0.6, 0.3, 0.1]. The first, second and third entries of the tuple correspond to a false positive (i.e., corresponding to the non-incident, or false positive class), incident ID 100 and incident ID 101, respectively. This means there is a 60% probability of the given security alert being treated as a false positive; a 30% probability of the given security alert being related to incident ID 100; and a 10% probability of the given security alert being related to incident ID 101.

As another example (assuming the same three incident classes), for another security alert, the supervised machine learning engine may provide guidance output of [0.3, 0.6, 0.1], which means there is a 60% probability that the security alert is related to incident ID 100; a 30% probability that the security alert is a false positive; and a 10% probability that the security alert is related to the incident ID 101.

For another security alert (assuming the same three incident classes), the supervised machine learning engine may generate a guidance output of [0.2, 0.2, 0.6], which means that there is a 60% probability that the security alert is related to incident ID 101; a 20% probability that the security alert is a false positive; and a 20% probability that the security alert is related to incident ID 100.

Although for the example scenarios described above there are three classes, in accordance with further example implementations there may be more than three or less than three classes. For example, in accordance with an example implementations, for an existing state of the SIEM, there may be hundreds of classes corresponding to hundreds of incidents (e.g., open or closed incidents on which the supervised machine learning engine has been trained), and one class corresponding to non-incidents, or false positives. Moreover, the number of classes may change over time, as new incidents are created and open incidents are closed by the security analysts.

As further described herein, the supervised machine learning engine may be trained on features of historical security alerts and their ultimate classifications by security analysts. The historical security alerts may be security alerts for which the supervised machine learning engine has provided guidance for which a security analyst escalated to relevant incidents as well as security alerts that were used to train the supervised machine learning engine before the engine was put in service.

In accordance with example implementations, the guidance output provided by the supervised machine learning engine may steer the security analyst to associate a given security alert to an incident or steer the security analyst to either determine that the given security alert is a false positive or escalate the security alert to be a new incident. For example, assuming two incidents (incident IDs 100 and 101), the supervised machine learning engine may generate a guidance output represented by the tuple [0.6,0.2,0.2], which means that there is a 60 percent probability that the security alert is a false positive, a 20 percent probability that the security alert relates to incident 100, and a 20 percent probability that the security alert relates to incident 101. The security analyst may interpret the guidance output to represent that the security analyst may interpret the guidance output to mean that the security alert is not a close match to either incident ID 100 or incident ID 101. As such, the security analyst may then make the assessment whether to escalate the security alert to be an incident or designate the security alert as being a false positive.

In general, the supervised machine learning engine may be trained with alerts, which were false positives and the supervised machine learning engine may, for a given security alert, emit lower probabilities for existing incidents (open or closed) meaning that the security alert is a false positive. The supervised machine learning engine may be seeing a particular security alert for the very first time; and because the supervised machine learning engine is not aware of the new alert, the engine may emit lower probabilities for existing incidents. At this point, it is up to the security analyst to decide if the security incident is a false positive or should be escalated to a new incident. In either of these cases, the supervised machine learning engine may represent that the security alert is a false positive, and in general, the security analyst decides whether or not the security alert is a false positive.

Depending on the particular implementation, the guidance output may or may not directly indicate the predicted probability that a given security alert is a false positive. In this manner, in accordance with some implementations, the guidance output may represent predicted probabilities for a given security alert corresponding to respective incident IDs and the guidance output may not explicitly display the predicted probability for the false positive, as it may be assumed that all of the probabilities (i.e., the incident probabilities and the false positive probabilities) add up to 100 percent.

Figure 1:
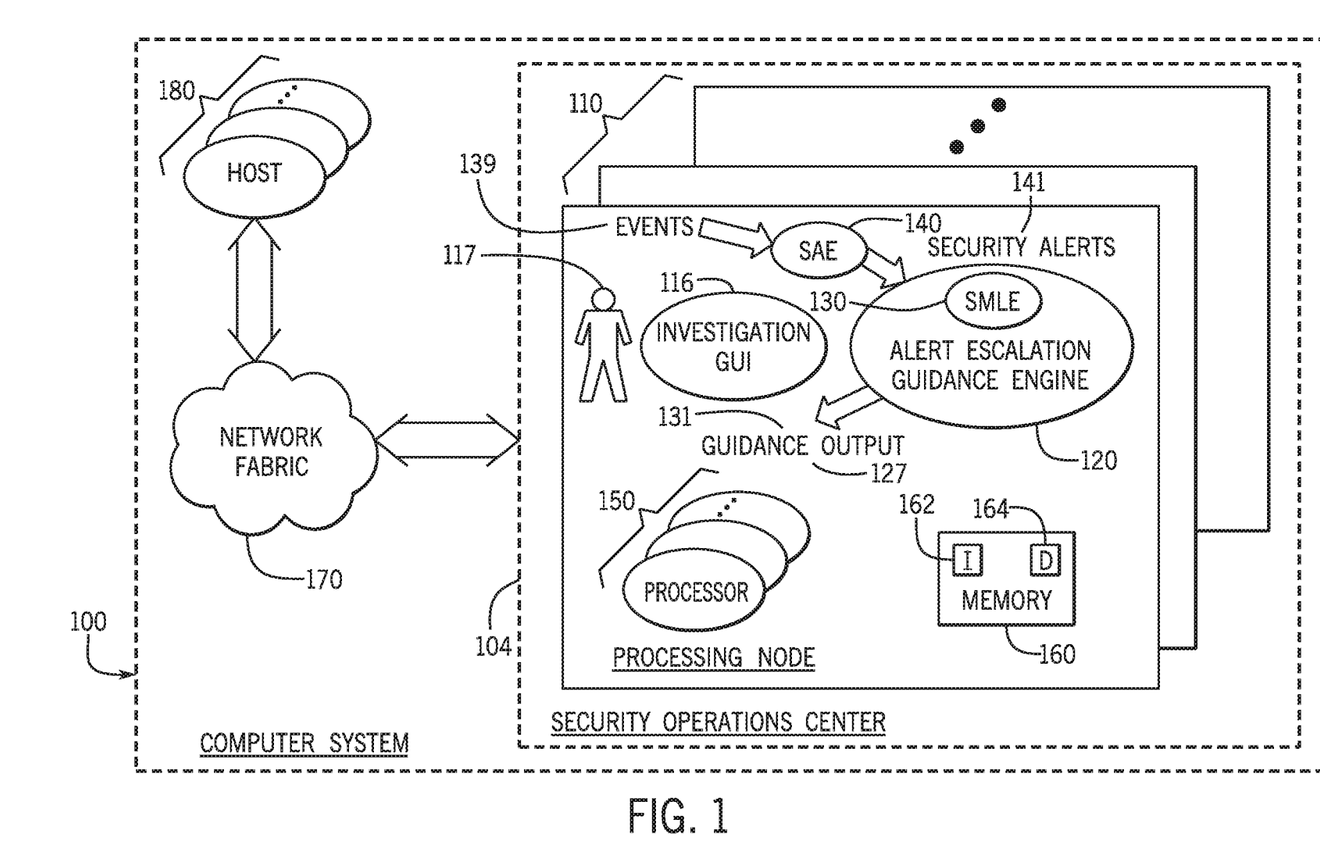
FIG. 1 is a schematic diagram of a computer system having a security alert escalation guidance engine according to an example implementation.

Referring to FIG. 1, as a more specific example, in accordance with some implementations, a computer system 100, such as a computer system of an enterprise, may include host computers, or "hosts 180," which communicate with each other and communicate with computing entities (not shown) outside of the computer system 100 via network fabric 170. In general, a host 180 may be any computing entity, such as a desktop computer, a server, a client, a tablet computer, a portable computer, a thin client, a rack-mounted computer, a cluster of computers, and so forth. Moreover, a particular host 180 may be virtual host that is hosted on an actual, physical machine.

In general, the computer system 100 may be a public cloud-based computer system, a private cloud-based computer system, a hybrid cloud-based computer system (i.e., a computer system that has public and private cloud components), a private computer system having multiple computer components disposed on site, a private computer system having multiple computer components geographically distributed over multiple locations, and so forth.

In general, the network fabric 170 may include components and use protocols that are associated with any type of communication network, such as (as examples) Fibre Channel networks, iSCSI networks, ATA over Ethernet (AoE) networks, HyperSCSI networks, local area networks (LANs), wide area networks (WANs), wireless networks, global networks (e.g., the Internet), or any combination thereof.

In accordance with example implementations, one or multiple security analytics engines 140 of the computer system 100 may, in an automated manner, monitor system events (e.g. monitor, in real-time in near real-time, logged data, communication streams, and so forth) and generate corresponding security alerts 141 for events 139 that are determined by the security analytics engines 140 to be likely to be associated with security threats to the computer system 100 and warrant further investigation by human security analysts 117. As examples, the events 139 may include one or more of the following: a login attempt by an unauthorized user; a misuse of access; a host exhibiting malicious activity; an unauthorized reconnaissance activity; a fraud by a legitimate user; an unauthorized movement across computer systems; a transfer or execution of an unauthorized executable; a transfer of confidential information to an unauthorized user or an unauthorized storage; or an unauthorized privilege escalation.

The security analysts 117 may be analysts who staff a security operations center (SOC) 104. In general, the security analysts 117 may use processor-based tools for purposes of performing a "security alert triage" to determine the severity of the incoming security alerts 141. In this manner, a security analysts 117 may, based on an initial assessment of a given security alert 141 and a guidance output 131 (further described herein) provided by the computer system 100, determine whether the given security alert 141 should be deemed to be severe enough to be related to an existing incident or escalated to be a newly-created incident, which the analyst creates at this point of time if the analyst believes that the security alert 141 is not related to an existing incident. After a security alert is escalated to an incident or related to a pre-existing incident, an analyst 117 may use processor-based tools for purposes of conducting an investigation of the underlying event(s) to determine whether the event(s) are due to an actual security threat and if so, determine the appropriate remediation actions to respond to the threat.

As an example, the computer system 100 may include one or multiple processing nodes 110, and one or multiple processing nodes 110 may contain one or multiple security analytics engines 140 that analyze event data for purposes of identifying behavior that is consistent with security threats to the computer system 100 for purposes of generating security alerts. The "event data" refers to data produced by operation of the computer system 100 and may originate with various sources of the computer system 100, such as the hosts 180, components of the network fabric 170, and so forth, as well as external entities (web servers, for example) that communicate with the computer system 100. As examples, the security analytics engines 140 may analyze event data associated with hypertext protocol (HTTP) logs, domain name service (DNS) logs, virtual private network (VPN) logs, netflow traffic, intrusion detection system (IDS) logs, and so forth. In accordance with various implementations, the event data analyzed by the security analytics engine 140 may be derived from hardware devices as well as from software components of the computer system 100.

The processing node 110 may further include one or multiple graphical user interfaces (GUIs), such as investigation GUIs 116, that are used by the security analysts 117 to evaluate or assess security alerts (to determine whether alerts are related to existing incidents or should be escalated to new incidents). In general, an "investigation GUI 116" refers to a processor-based tool (i.e., a tool formed at least in part by a hardware processor) that may be used by a security analysts 117 to perform an initial investigative assessment of security alerts 141 and perform fuller investigations for incidents for purposes of determining whether the incidents are related to actual security threats to the computer system. As further described herein, a given security alert evaluation or incident investigation may involve multiple investigative steps in which the security analyst 117 provides input (via mouse clicks, mouse movements, keyboard strokes, and so forth) to the investigation GUI 116, and the investigation GUI 116 provides an output (visual images on a hardware monitor, audio output, files, and so forth) to guide the investigation and ultimately lead to a final determination (i.e., determine whether a given security alert 141 should be escalated to an incident, whether a given security alert is related to an existing incident, whether an incident is due to an actual security threat to the computer system 100, accounts, devices and domains associated with an identified security threat, and so forth).

As an example, as further described herein, the investigation GUI 116 may include a "search" section in which the security analyst 117 may enter input and view output representing a result of that input for purposes of conducting a "search" for a particular investigative step. The search section may be used by the security analyst 117 to create multiple search instances. Each search instance may be associated with an independent investigation, or multiple search instances may be associated with the same investigation.

As examples, a search instance may be a window (of the GUI 116) in which the analyst may enter a query search for information pertaining to particular devices of the computer system 100, user accounts, and so forth. Moreover, the search instance may allow the security analyst 117 to enter parameters that constrain the queries, such as a time range and various filters. Moreover, the search instance may include a visualization region, where charts pertaining to the search are created for purposes of conducting comparative analyses of search results. In general, the creation of a chart may involve the security analyst's selection of a chart type, axes for the chart, filters and other parameters.

In general, the investigation of a given incident or the evaluation of a given security alert may involve a number of inquiries, analyses and decisions that are made by a security analyst 117 in a series of investigative steps. As examples, a given investigative step may include the security analyst making a decision to identify which events and/or which category of data is to be evaluated next; decisions pertaining to selecting the types of charts for analysis of gathered data;

decisions pertaining to chart parameters (e.g., the axes, filters, categories, time granularity), and so forth. The investigation may involve a sequence of investigative steps, where each step may involve particular data, devices and/or events, visualization of the gathered information and/or the analysis of the gathered information.

A given security operations center may process a relatively large number of security alerts 141 (hundreds to thousands of security alerts per day, for example) for purposes of determining whether the security alerts 141 should be escalated to new incidents, combined with existing incidents, or determined to be related to non-security threats. In accordance with example implementations, a given processing node 110 may include one or multiple alert escalation guidance engines 120, which provide guidance output 131 (via displayed output, for example) to security analysts 117 to guide "security alert triage," i.e., to aid classification by the security analyst 117 of the security alerts 141 for purposes of determining whether the alerts should be related to existing incidents, escalated to new incidents, be ignored, and so forth. In this manner, in accordance with some implementations, the alert escalation guidance engine 120 determines, based on features of a given security alert 141, whether the security alert 141 is likely to be escalated to existing incidents and/or whether the security alert 141 is likely to be a false positive. More specifically, in accordance with example implementations, the alert escalation guidance engine 120 may determine confidence levels, or probabilities, that a given security alert 141 belongs to certain "classes," where these classes correspond to existing incidents and may also include a false positive class.

In accordance with example implementations, the alert escalation guidance engine 120 may include a supervised machine learning engine 130, which, in accordance with example implementations, is trained based on labeled training data in the form of historical security alerts and their ultimate classifications as being incidents or not. In this manner, as further described herein, the training of the supervised machine learning engine 130 may involve extracting features of security alerts, which are used as inputs to the machine learning and training the machine learning engine 130 based on the corresponding incident labels assigned to these security alerts. In accordance with some implementations, the supervised machine learning engine 130 may employ random forest-based classification, although other supervised machine learning algorithms (naïve Bayes-based machine learning, nearest neighbor-based machine learning, support vector machine-based machine learning, and so forth) may be used in accordance with further implementations.

In accordance with some implementations, the training of the supervised machine learning engine 130 may be ongoing, in that the engine 130 may be trained "on the job" by observing which security alerts 141 (and their associated features) are classified by the security analysts 117 as being incidents, classified as being related to other incidents, and so forth. Therefore, in accordance with example implementations, the supervised machine learning engine 130 has been trained on the security alert features that corresponding to incidents of all kinds (i.e., open incidents and closed incidents); and as such, the supervised machine learning engine 130 has been trained to recognize security alerts 141 as belonging to these incident classes.

In accordance with example implementations, the processing node 110 may include one or multiple physical hardware processors 150, such as one or multiple central processing units (CPUs), one or multiple CPU cores, and so forth. Moreover, the processing node 110 may include a local memory 160. In general, the local memory 160 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 160 may store various data 164 (data representing features of security alerts being processed by the supervised machine learning engine 130, parameters of the classification algorithm used by the supervised machine learning engine 130, including the program states of the engine 130, output of the supervised machine learning engine 130, recommendations or guidance provided by the supervised machine learning engine 130, probabilities or confidence levels provided by the supervised machine learning engine 130, and so forth). The memory 160 may store instructions 162 that, when executed by the processor(s) 150, cause the processor(s) 150 to form one or multiple components of the processing node 110, such as, for example, the alert escalation guidance engine(s) 120 and the supervised machine learning engine(s) 130.

In accordance with some implementations, each processing node 110 may include one or multiple personal computers, workstations, servers, rack-mounted computers, special purpose computers, and so forth. Depending on the particular implementations, the processing nodes 110 may be located at the same geographical location or may be located at multiple geographical locations. Moreover, in accordance with some implementations, multiple processing nodes 110 may be rack-mounted computers, such that sets of the processing nodes 110 may be installed in the same rack. In accordance with further example implementations, the processing nodes 110 may be associated with one or multiple virtual machines that are hosted by one or multiple physical machines.

In accordance with some implementations, the processor 150 may be a hardware circuit that does not execute machine executable instructions. For example, in accordance with some implementations, the alert escalation guidance engine 130 may be formed in whole or in part by an application specific integrated circuit (ASIC), a field programmable gate array (FPGA), and so forth. Thus, many implementations are contemplated, which are within the scope of the appended claims.

Figure 2:
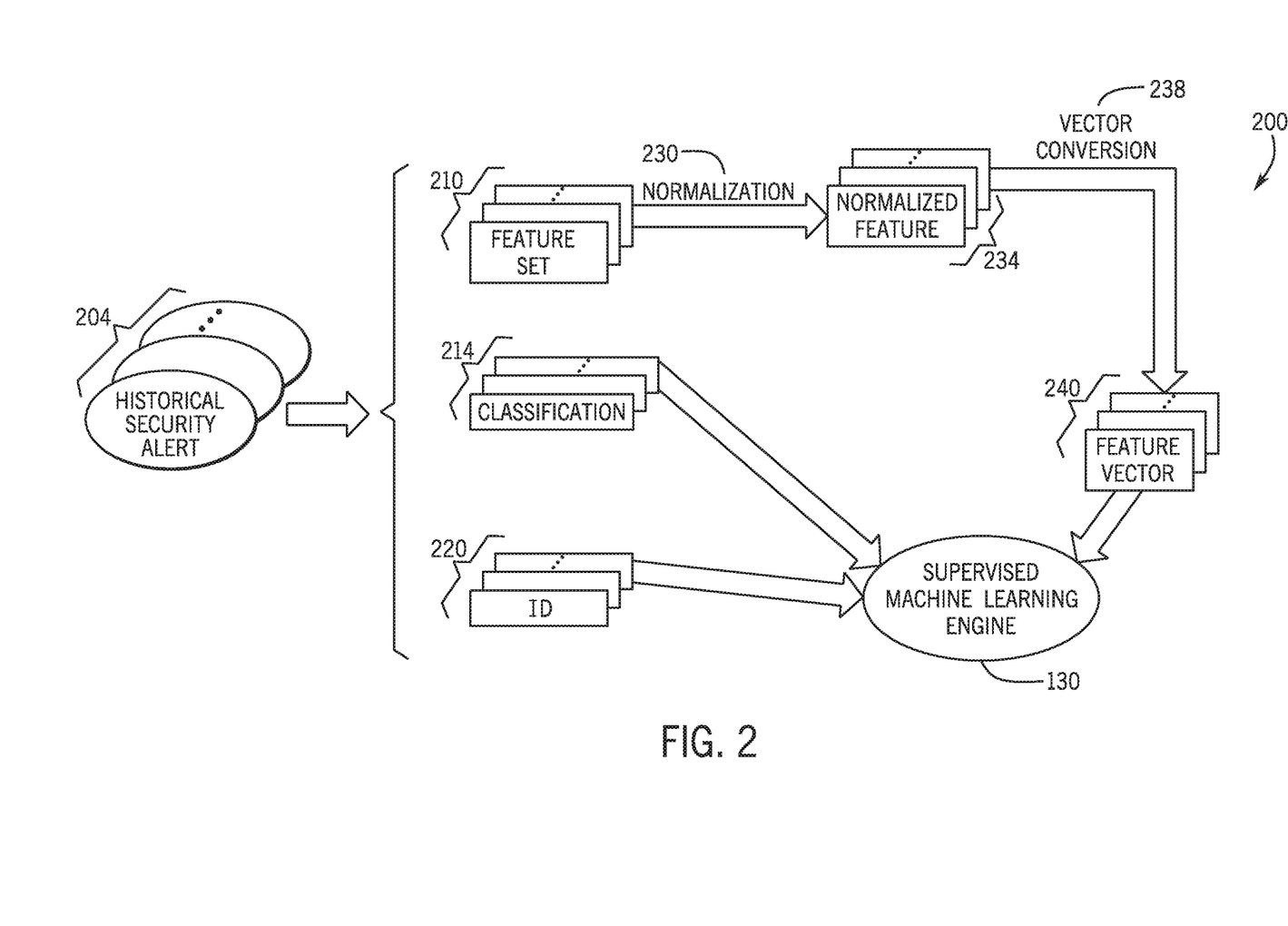
FIG. 2 is an illustration of a process to train a supervised machine learning engine of the security alert escalation guidance engine according to an example implementation.

FIG. 2 is an illustration 200 of a process to train the supervised machine learning engine 130, in accordance with example implementations. In general, the supervised machine learning engine 130 may be trained by observing features of historical security alerts 204 and their corresponding incident/false positive classifications. A historical security alert 204, in the context of this application, refers to any security alert on which the supervised machine learning engine 130 is trained, including security alerts used to initially train the supervised machine learning engine 130 before the engine 130 was put in service, as well as security alerts for which the supervised machine learning engine 130 has provided guidance outputs and which were "labeled" by the actions that were taken by security analysts (e.g., escalated to be incidents, labeled as false positives, closed without being escalated to incidents, and so forth).

In accordance with some implementations, a given historical security alert 204 may have a corresponding feature set 210, a corresponding classification 214 and a corresponding identification (ID) 220. The feature set 210 contains a set of one or multiple features of the security alerts, corresponding to one or multiple predetermined input feature categories.

For example, depending on the particular implementation, the supervised machine learning engine 130 may consider one or multiple of the following security alert features. The security alert features may include an initiator user name (the initiating user account name, for example); a target user name (a target user account name, for example); and an initiator user ID (the initiating user account ID, for example). Moreover, the security alert features may include a target user ID (a target user account ID, for example); and an initiator user full name (the full name of the user associated with the account, for example); the target user full name (the target user full name associated with an account, for example); a target trust name (the name of a group/role/profile, for example); or a target trust domain (a domain of the target trust name, for example).

The security alert features may include a priority (a priority of "low," "medium," or "high," as examples); a repeat count (the number of times that the same alert has been generated, for example); or a vulnerability (a flag that indicates whether exploit detection has matched this attack against known vulnerabilities in the target, such as a binary, Boolean flag, for example). The security alert features may include a source Internet Protocol (IP) address (an IP address of the source system, for example); a target IP address (the IP address of the target system, for example); a source port, or a destination port (a destination port or service name, for example). The security alert features may include a policy ID (the ID of the policy that caused the security alert, for example); a target data name (the name of the object, such as a file, a database table, a directory object, and so forth); or a target data container (the name of the container where the target data name exists, for example). The security alert features may include a target data sensitivity, such as a local sensitivity level of the target data object, based on how the event source uses the data in the object.

The security alert features may include a source host country (the country where the source IP address is located, for example); a target host country (the country where the target IP address is located, for example); a source host threat score (a source host threat reputation score, for example); a target host threat score (a target host reputation score, for example); or a source host threat type (the type of the threat like a botnet, proxies, worms, spyware, Trojans, for example). The security alert features may include a target host threat type (the type of threat like botnet, proxies, worms, spyware, Trojans, for example).

The security alert features may include a vendor outcome code (a third party event code that is assigned to this class of security alert or event by the event source vendor, for example). The security alert features may include an xdasclass or an xdasidentifier (a class type to which the alert belongs to, an authentication type, account management type, data access type or configuration change type, for example). Moreover, a security alert feature may be a feature such as an xdasoutcome or xdasdetail (a representation of whether the particular action was successful, failed denied or forbidden, as examples).

Regardless of the particular composition of the feature set 210, the alert escalation guidance engine 120 may further process the feature set 210 to perform a normalization 230 to produce a corresponding normalized feature set 230 for each feature set 210. For example, a particular security alert feature may have a value within an associated range such that the same feature for other feature sets may vary in respective ranges, which differ. The normalization ensures that the features vary the same within the normalized range. For example, a particular security alert feature designating the severity may, in one security alert range from 0 to 10 and the corresponding severity in another security alert may vary in a range of 0 to 5. The normalization may adjust these features so that each severity feature varies in a range from 0 to 100, for example.

As depicted in FIG. 2, after the input features are normalized, the alert escalation guidance engine 120 may perform a vector conversion 238 for purposes of converting the normalized feature sets 234 into corresponding feature vectors 240. In this manner, for categorical values, the alert escalation guidance engine 120 may, use, for example, one hot encoding, and for strings, the engine 120 may first apply string indexing. With one hot encoding, categories assigned to corresponding integer values, and then, if the integer encoding is not sufficient due to ordinal relationships existing for the category, encoding may be used and a binary variable is added for each unique integer value. The application of the string indexing includes using string indexers to identify columns as corresponding categorical values or convert textual data to corresponding numeric data, keeping the categorical context. After the alert escalation guidance engine 120 performs string indexing, the engine may then use one hot encoding to assign a binary variable for each unique integer value.

As depicted in FIG. 2, the supervised machine learning engine 130 may be trained using the feature vectors 240, the corresponding classifications 214 (i.e., the "labels") and the corresponding IDs 220. From this information, the supervised machine learning engine 130 may be trained to classify a given security alert and determine corresponding probabilities or confidence levels that represent whether the security alert is a false positive or represent the likelihoods that the security incident is related to existing incidents.

In accordance with some implementations, the supervised machine learning engine 130 is trained to determine probabilities of a given security event belonging to a plurality of security threat classes, where each class corresponds to a security threat and may be related to an incident (open or closed) on which the engine 130 has been trained. Moreover, in accordance with example implementations, the supervised machine learning engine 130 may be configured to limit the identified classes (i.e., the number of identified incidents) to a predetermined number of "best" matches (the top two or three matches, for example); provide corresponding probabilities for the security alert belonging each of these classes; and provide a probability that the security alert is a false positive.

Figure 3:
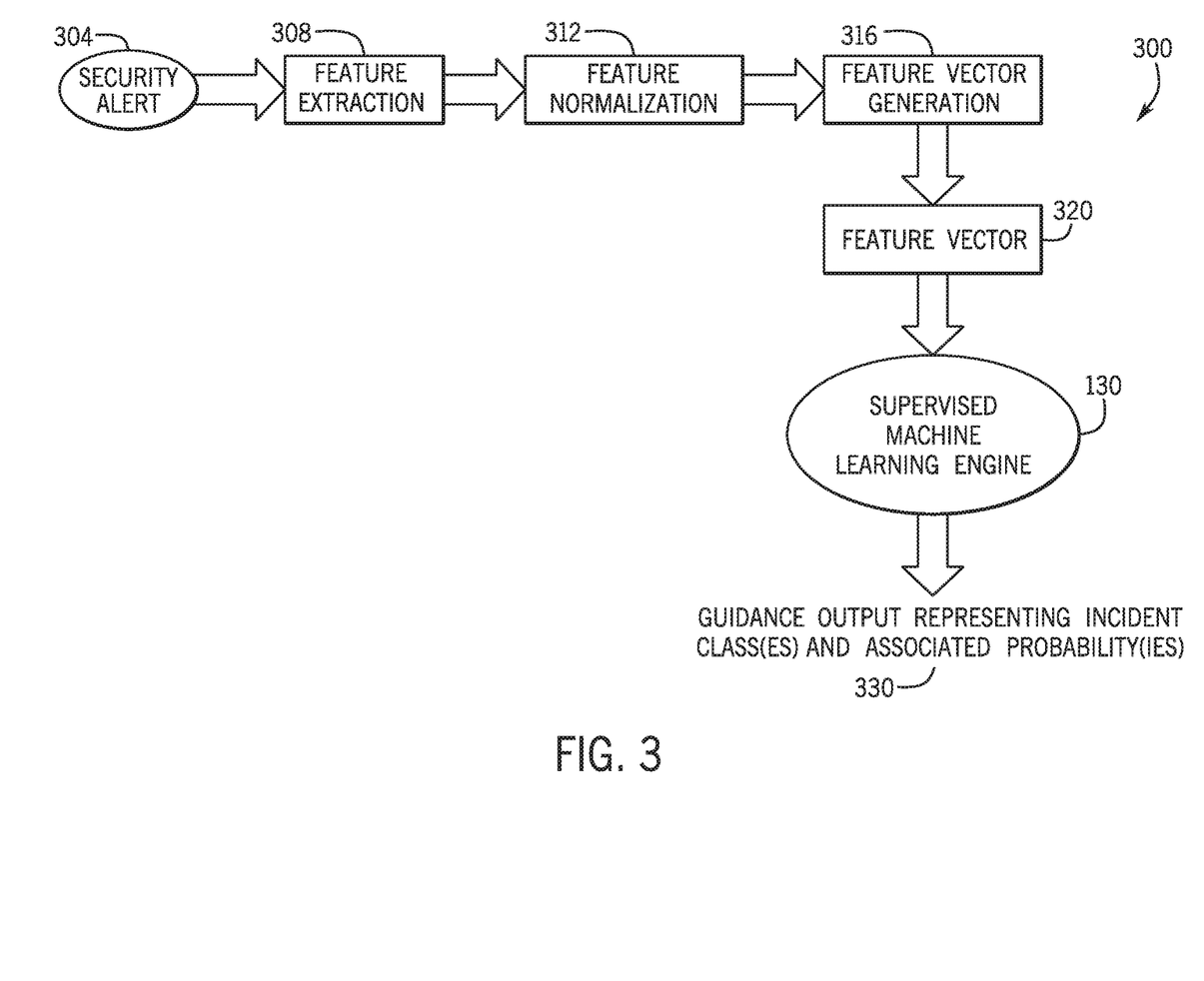
FIG. 3 is an illustration of a process to use the security alert escalation guidance engine to provide an output representing an incident classification and an associated confidence level in the classification according to an example implementation.

FIG. 3 is an illustration 300 of a process depicting classification of security alerts by the supervised machine learning engine 130 in accordance with some implementations. As depicted in FIG. 3, for a given security alert 304, the process 300 includes extracting (block 308) features of the alert and normalizing (block 312) the features. From the feature normalization 312, feature vector generation 316 is applied to generate a corresponding feature vector 320. Accordingly, from the feature vector 320, the supervised machine learning engine 130 may then determine and provide a guidance output 330 representing one or multiple possible incident classes (e.g., one or multiple classes corresponding to existing incidents and a class corresponding to false positive classification, for example) for the security alert 304 and the associated probability(ies).

Figure 9:
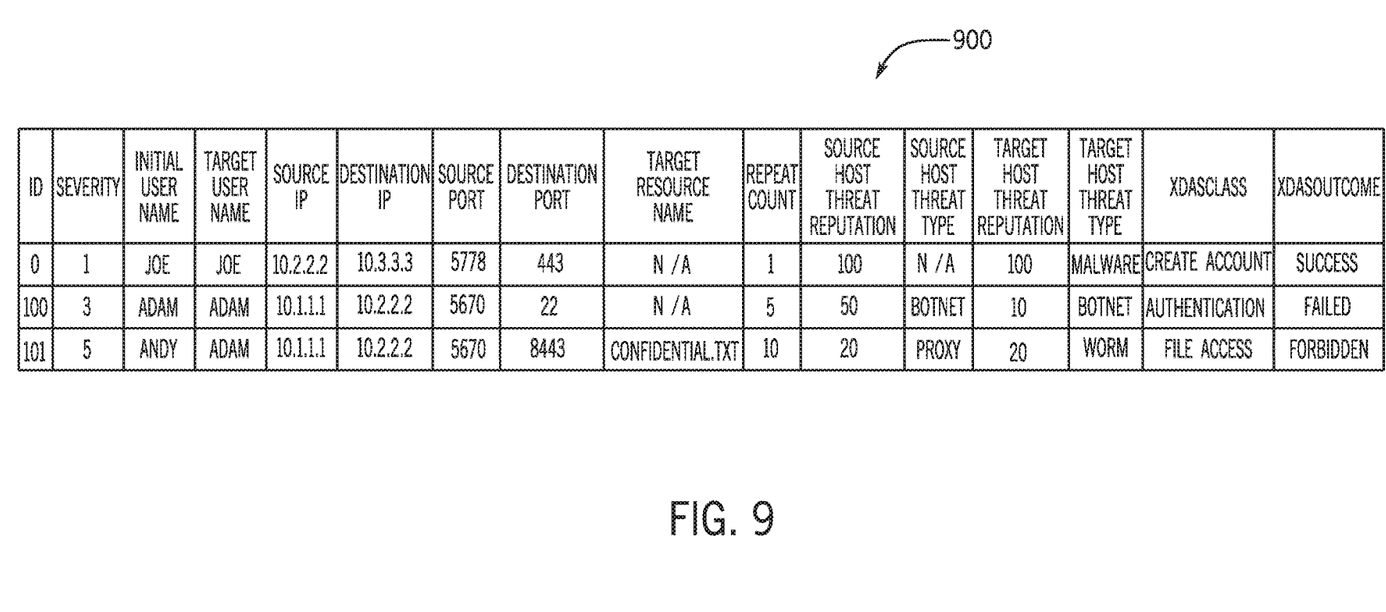
FIG. 9 is an illustration of features associated with incidents according to an example implementation.

Table 900 (FIG. 9) depicts three example incident IDs and their corresponding features. In the table 900, incident IDs 100 and 101 correspond to security alerts that were escalated to corresponding incidents, and incident ID 0 corresponds to a security alert that was classified as being a false positive.

Figure 4:
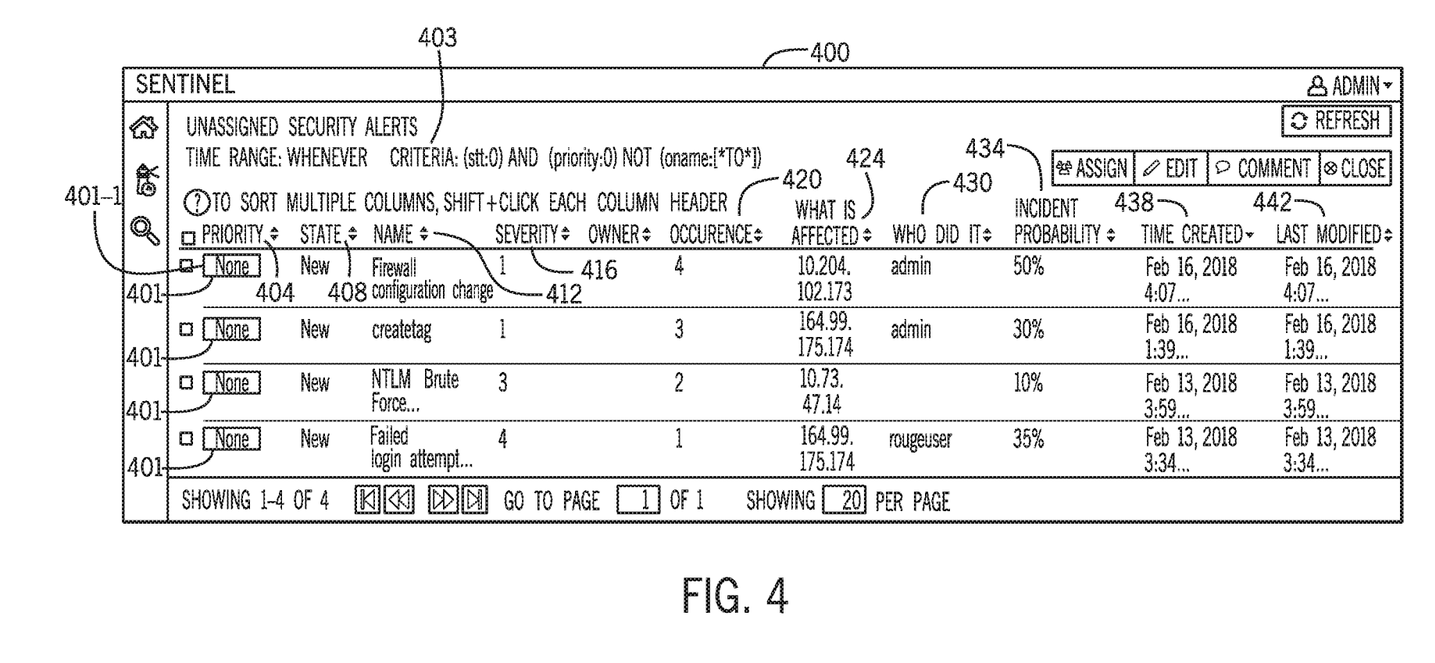
FIGS. 4 and 5 are illustrations of windows displayed by an investigation graphical user interface (GUI) according to example implementations.

FIG. 4 depicts an example guidance output that may be provided by the supervised machine learning engine 130 in accordance with example implementations. In particular, FIG. 4 depicts a GUI window 400 that may be provided by the investigation GUI 116 in accordance with example implementations. In accordance with example implementations, the GUI window 400 may concurrently display information for multiple security alerts. More specifically, in accordance with example implementations, the GUI window 400 displays a row 401 of information for each "new" security alert (e.g., displays information for security alerts that have yet to be escalated, designated as to be ignored by a security analyst 117, or otherwise meet some criteria (a time criteria, for example) for not being considered to be important). The security analyst 117 may interact with the GUI window 400 (via mouse clicks or keyboard entry, for example), to scroll through the security alert rows 401; and in accordance with some implementations, the security alert rows 401 may automatically scroll so that the row 401 for the newest security alert appears at the top and the row 410 for the oldest displayed security alert automatically scrolls off the bottom.

The GUI window 400 includes columns 404, 408, 412, 416, 420, 424 and 430, contain information representing a priority of the security alert; a state of the security alert (e.g., a state of new, false positive, ignore, and so forth); a name, or identifier, for the security alert; a severity of the security alert; a number of times that the security alert or similar security alert has occurred; an IP address affected by the security alert and a user name associated with the security alert; respectively. In accordance with example implementations, the security alert identifiers, or names, in column 412 may be hyperlinks so that by selecting a particular name (by mouse clicking on the name, for example), a security analyst 117 may cause the investigation GUI 116 to display another window, such as example GUI window 500 (FIG. 5) discussed below, which displays information for incidents that may be related to an example firewall configuration security alert associated with row 401-1.

The GUI window 400 may include a column 434 that contains an "incident probability" for each security alert. In accordance with example implementations, the "incident probability" represents the maximum of the incident probabilities for the security alert. For example, the supervised machine learning engine 130 may determine the following probabilities and classes for a given security alert: the security has a 60 percent probability of belonging to incident ID 104, has a 15 percent probability of belong to incident ID 168, and has a 25 percent probability of being a false positive. For this example, the incident probability is 60 percent (the maximum of 60 and 15), and the investigation GUI 116 displays "60%" in column 434 of the corresponding row 401 for this security alert.

The GUI window 400 may depict other information for the security alerts, in accordance with example implementations. For example, as depicted in FIG. 4, the GUI window 400 may include columns 438 and 442 that contain information for the time created and time of last modification for the security alert. As depicted at reference numeral 403, the GUI window 400 may also allow the entry of criteria 403 to allow the security analyst 117 to target security alerts having specified features.

Figure 5:
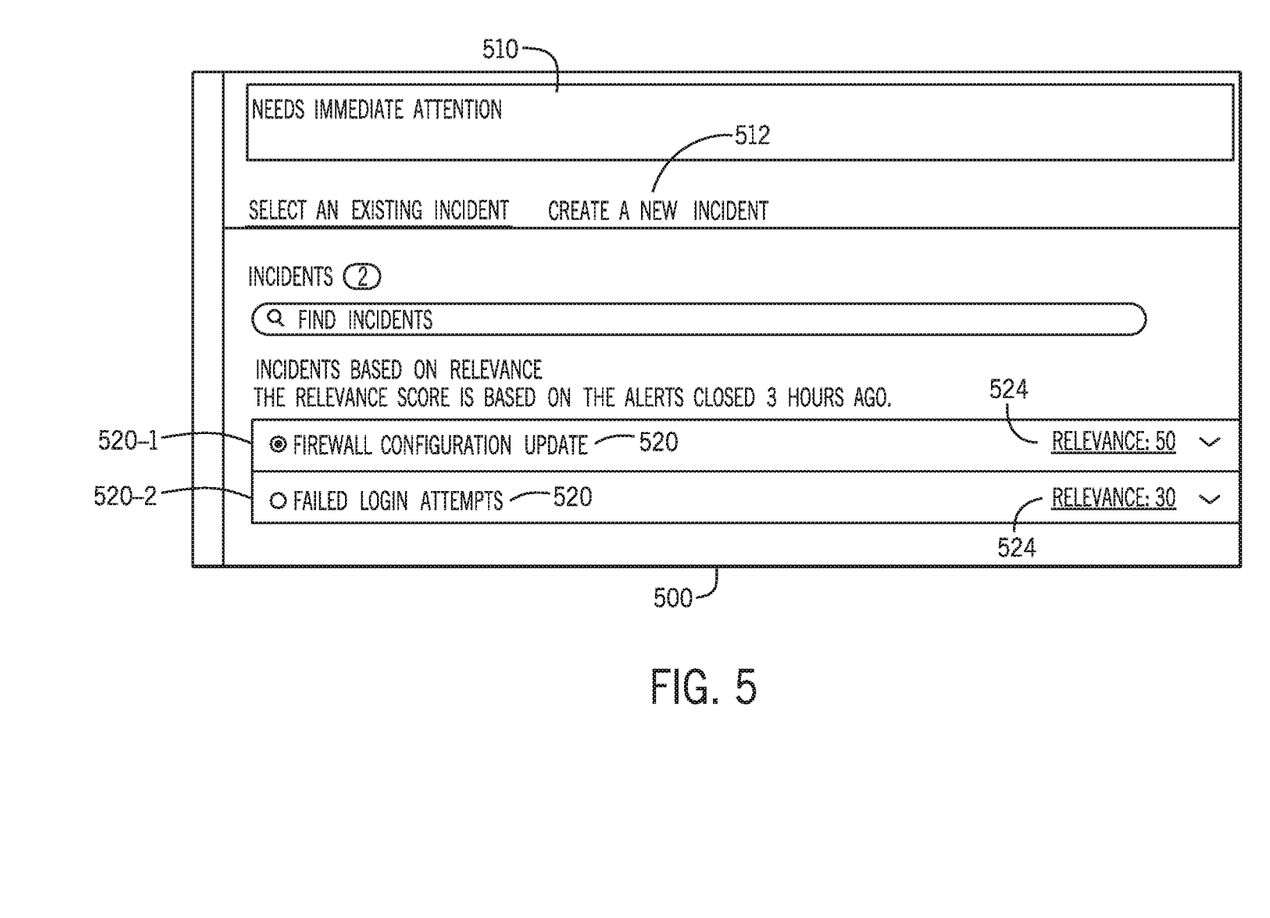

FIG. 5 depicts an example GUI window 500 that concurrently displays multiple entries, or rows 520 (example rows specifically depicted), of information for respective incidents that may be related to a particular security alert. The incident is identified in each row 520 by a corresponding identifier, or name, which may be a hyperlink. For example, the security analyst 117 may, for example, click on a name hyperlink (i.e., click on an incident identifier) in row 401-1 of the GUI 400 (FIG. 4) to cause the investigation GUI 116 to display a GUI window for the corresponding firewall configuration security alert. For each row 520 (corresponding to a potential incident), the GUI window 500 displays a confidence level 524 that the security alert is related to the incident. The rows 520-1 and 520-2 for this example correspond to incidents related to a firewall configuration update incident and a number of failed login attempts, respectively. In accordance with example implementations, the GUI 500 displays radio buttons in each row 520 to allow the selection of one of the rows 520 by the security analyst 117, and in accordance with some implementations, the row 520 that is associated with the incident that is most likely related to the security alert appears on the top row 520 and its radio button is automatically selected by the investigation GUI 116 (although the selection can be changed by the actions taken by the security analyst 117). In this manner, in accordance with example implementations, the investigation GUI 116 may order, or rank, the rows 520 in descending order according to the probabilities that are associated with the incidents.

When a particular row 520 is selected, the security analyst 117 may select (via a mouse click, for example) a "Create A New Incident" hyperlink 512 to escalate the security alert so that the security alert becomes associate with that incident.

The GUI window 500 may display other information and allow entry of other information for a given security alert, in accordance with example implementations. For example, as depicted in FIG. 5, the GUI window 500 may provide a comment field 510 for a security analyst 117 to enter information textual information about the security alert.

In accordance with some implementations, the supervised machine learning engine 130 may provide further guidance in the form of a recommended security analyst 117 for a particular incident. In this manner, in accordance with example implementations, the supervised machine learning engine 130 may perform an ongoing training to associate preferred security analysts 117 with different classes of incidents. For example, in accordance with some implementations, the supervised machine learning engine 130 may have a set of one or multiple security analysts 117 that are preferred for processing certain types of incidents, such that analysts 117 that are associated with particular malware, analysts 117 that are associated with particular malicious domains, analysts 117 associated with processing security threats associated with downloading classified documents, and so forth.

Depending on the particular implementation, the supervised machine learning engine 130 may associate particular security analysts 117 with certain incident categories based on one or more criteria. For example, the supervised machine learning engine 130 may log processing times for various incidents and recommend a particular security analyst 117 processing a given incident for the case in which the security analyst 117 has an associated faster processing time (as indicated by the logged begin and end times for instances belonging to the category, for example). As another example, in accordance with some implementations, the supervised machine learning engine 130 may be trained on classification accuracies by the security analysts 117. In this manner, the supervised machine learning engine 130 may assign scores to incidents, where a given score represents that a particular security analyst may have relatively higher accuracy results (for a certain incident classification, as compared to another security analyst 117).

Figure 6:
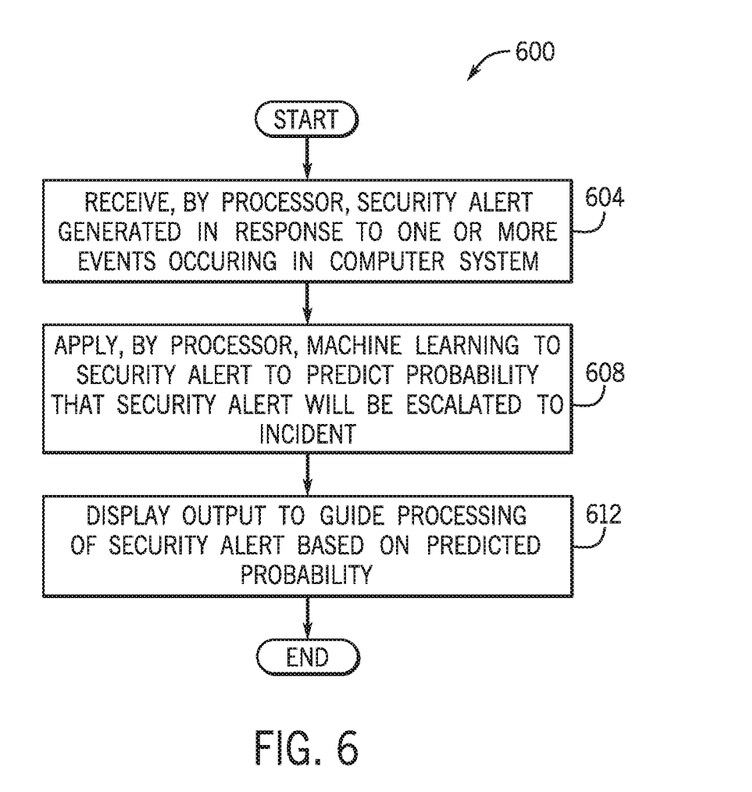
FIG. 6 is a flow diagram depicting a technique to provide guidance for a security alert according to an example implementation.

Referring to FIG. 6, in accordance with example implementations, a technique 600 includes receiving (block 604), by a processor, a security alert that is generated in response to one or more events occurring in a computer system. The technique 600 includes applying (block 608), by the processor, machine learning to the security alert to predict a probability that the security alert will be escalated to an incident; and displaying (block 612) an output on a display to guide processing of the security alert based on the predicted probability.

Figure 7:
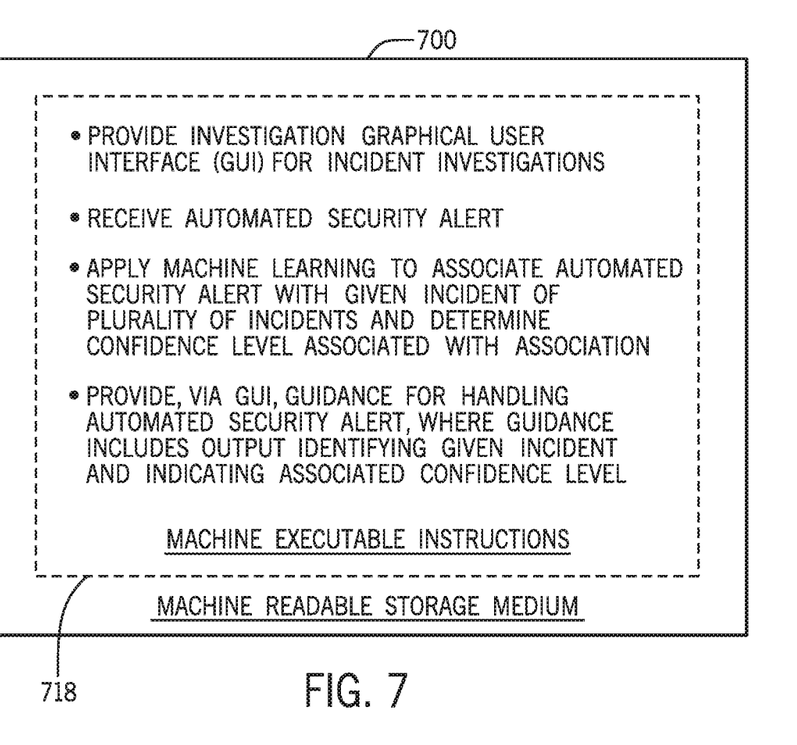
FIG. 7 is an illustration of machine executable instructions stored on a non-transitory machine readable storage medium to cause a machine to provide guidance for a security alert according to an example implementation.

Referring to FIG. 7, in accordance with example implementations, a non-transitory machine readable storage medium 700 stores machine executable instructions 718 that, when executed by a machine, cause the machine to provide an investigation graphical user interface (GUI) for incident investigations. The instructions, when executed by the machine, cause the machine to receive an automated security alert; apply machine learning to associated the security alert with a given incident of a plurality of incidents and determine a confidence level associated with the association; and provide, via the GUI, guidance for handling the security alert. The guidance includes an output that identifies the given incident and indicates the associated confidence level.

Figure 8:
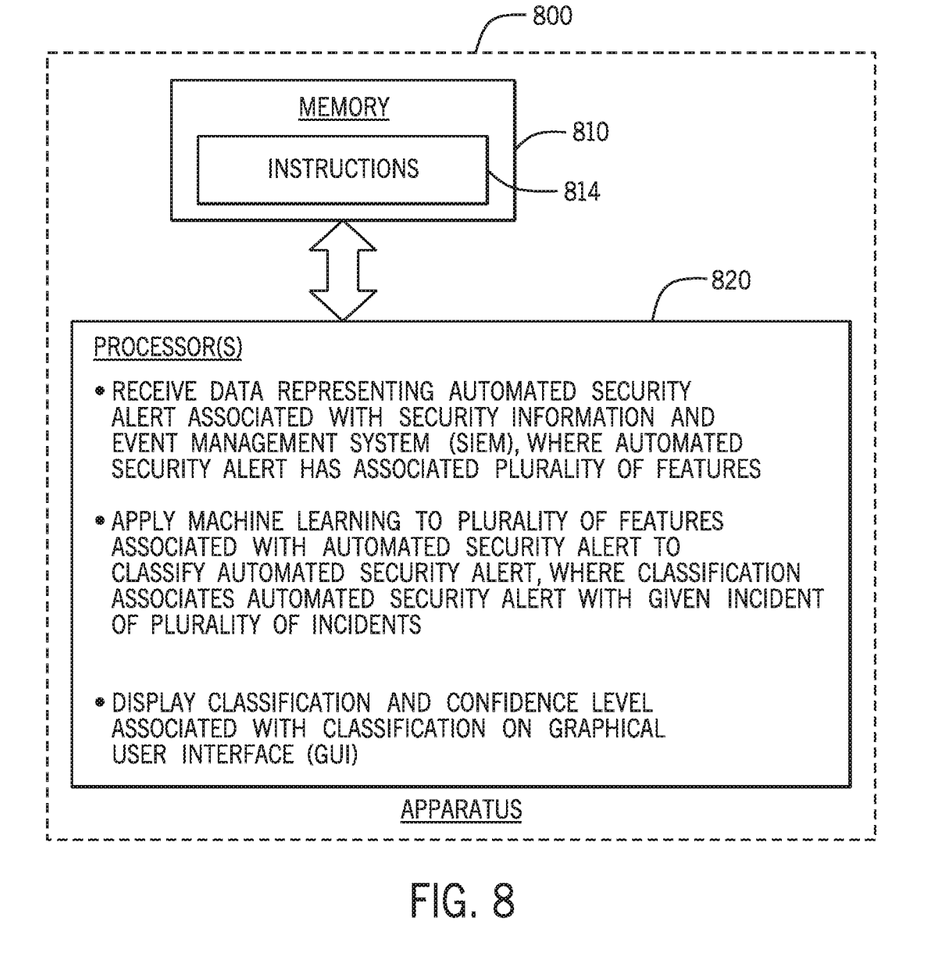
FIG. 8 is an illustration of an apparatus to provide guidance for a security alert according to an example implementation.

Referring to FIG. 8, in accordance with example implementations, an apparatus 800 includes at least one processor 820 and a memory 810 to store instructions 814 that, when executed by the processor(s) 820, cause the processor(s) 820 to receive data representing an automated security alert that is associated with a Security Information and Event Management System (SIEM). The automated security alert has an associated plurality of features. The instructions, when executed by the processor(s) 820, cause the processor(s) 820 to apply machine learning to the plurality of features that are associated with the automated security alert to classify the automated security alert; and display the classification and a confidence level that is associated with the classification on a graphical user interface (GUI). The classification associates the automated security alert with a given incident of a plurality of incidents.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:

1. A method, comprising:
receiving, by a processor, a security alert generated in response to an event occurring in a computer system;
applying, by the processor, machine learning to the security alert to predict a first probability that the security alert will be escalated to a first incident of a plurality of incidents; and
displaying an output on a display to guide processing of the security alert based on the first probability,
wherein a sum of all probabilities for the plurality of incidents equals 100 percent.

2. The method of claim 1, wherein displaying the output comprises concurrently displaying an identifier for the security alert and the first probability.

3. The method of claim 1, wherein applying the machine learning comprises predicting a second probability that the security alert will be escalated to a second incident of the plurality of incidents, other than the first incident.

4. The method of claim 3, wherein displaying the output comprises concurrently displaying both the first probability that the security alert will be escalated to the first incident and the second probability that the security alert will be escalated to the second incident.

5. The method of claim 3, further comprising:
determining that the first probability is greater than the second probability,
wherein displaying the output comprises concurrently displaying an identifier for the security alert and the first probability in response to the determination that the first probability is greater than the second probability.

6. The method of claim 5, wherein displaying the output comprises concurrently displaying, in response to an input representing inquiry into the security alert, the first and the second probabilities and first and second identifiers respectively representing the first and the second incidents.

7. The method of claim 6, wherein concurrently displaying the first and the second probabilities and the first and second identifiers comprises:
displaying a first entry including the first probability and the first identifier, and a second entry including the second probability and the second identifier; and
ordering the first and the second entries in a descending order according to the first and the second probabilities included in the first and the second entries.

8. The method of claim 1, wherein applying machine learning comprises applying supervised machine learning.

9. The method of claim 1, further comprising:
applying machine learning to associate the first incident to a particular security analyst of a plurality of security analysts; and
providing a recommendation that the particular security analyst process the first incident.

10. The method of claim 1, wherein the security alert comprises an automated alert generated in response to the event representing anomalous behavior associated with the computer system.

11. The method of claim 1, wherein the event is a login attempt by an unauthorized user; a misuse of access; a host exhibiting malicious activity; an unauthorized reconnaissance activity; a fraud by a legitimate user; an unauthorized movement across computer systems; a transfer or execution of an unauthorized executable; a transfer of confidential information to an unauthorized user or an unauthorized storage; or an unauthorized privilege escalation.

12. A non-transitory machine-readable storage medium storing machine executable instructions that, when executed by a machine, cause the machine to:
provide an investigation graphical user interface (GUI) for incident investigations;
receive an automated security alert;
apply machine learning to associate the automated security alert with a given incident of a plurality of incidents and to determine a confidence level associated with the given incident; and
provide, via the GUI, guidance for handling the automated security alert,
wherein the guidance comprises an output identifying the given incident and indicating the associated confidence level and
wherein the confidence level for each of the given incidents is divided between a total percentage of 100 percent.

13. The storage medium of claim 12, wherein the given incident comprises an existing incident associated with at least one other security alert.

14. The storage medium of claim 12, wherein the output indicates an associated confidence level of the automated security alert being a false positive.

15. The storage medium of claim 12, wherein the instructions to apply machine learning comprise instructions that, when executed by the machine, cause the machine to:
  apply machine learning to a plurality of features of the automated security alert,
  wherein the plurality of features represent at least one of:
    whether a user associated with the automated security alert is a source user,
    whether a user associated with the automated security alert is a target user,
    an Internet Protocol address of a source asset associated with the automated security alert,
    an Internet Protocol address of a target asset associated with the automated security alert,
    a reputation score associated with the automated security alert,
    a type of asset associated with the automated security alert,
    an accessed service associated with the automated security alert,
    an accessed resource associated with the automated security alert,
    a category of action associated with the automated security alert, or
    a result of an action associated with the automated security alert.

16. An apparatus, comprising:
  at least one processor; and
  a memory to store instructions that, when executed by the at least one processor, cause the at least one processor to:
    receive data representing an automated security alert associated with a Security Information and Event Management System (SIEM), wherein the automated security alert has an associated plurality of features;
    apply machine learning to the associated plurality of features associated with the automated security alert to classify the automated security alert, wherein the classification of the automated security alert associates the automated security alert with a given incident of a plurality of incidents; and
    display the classification of the automated security alert and a confidence level associated with the classification of the automated security alert on a graphical user interface (GUI),
    wherein the confidence level for each of the automated security alerts is divided between a total percentage of 100 percent.

17. The apparatus of claim 16, wherein the instructions, when executed by the at least one processor, cause the at least one processor to determine probabilities that the automated security alert is associated with at least two incidents of the plurality of incidents.

18. The apparatus of claim 16, wherein the machine learning comprises supervised machine learning.

19. The apparatus of claim 16, wherein the associated plurality of features comprise entries of a feature vector, and the instructions, when executed by the at least one processor, cause the at least one processor to:
  extract features of a feature set associated with the automated security alert;
  normalize the extracted features; and
  convert the normalized extracted features into the entries of the feature vector.

20. The apparatus of claim 19, wherein the instructions, when executed by the at least one processor, cause the at least one processor to apply one hot encoding to convert the normalized extracted features into the entries of the feature vector.

* * * * *